3,385,288
KETTLE FOR THE COOKING AND/OR STEAMING OF COMESTIBLES

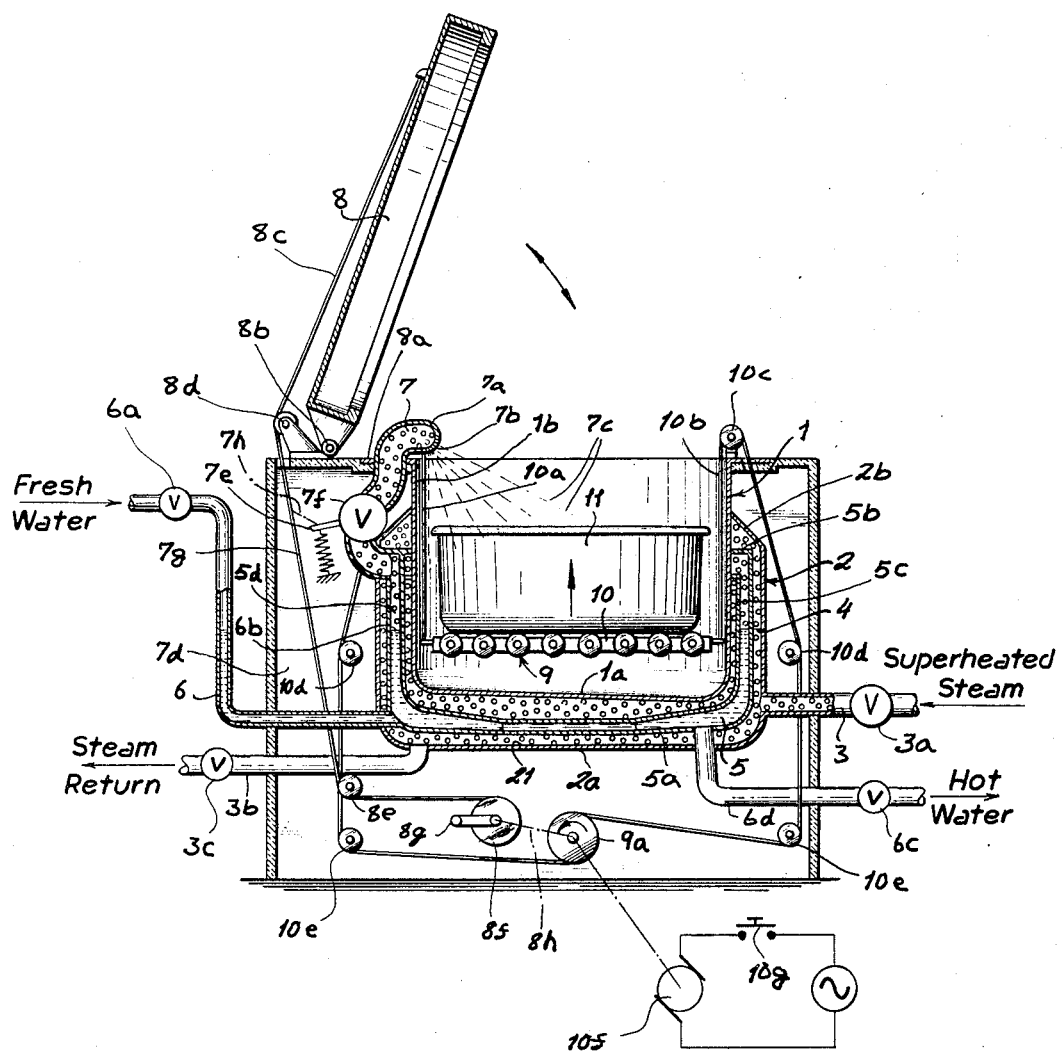

Alfred Lohr and Helmut Hemmann, Herborn, and Karl Tropp, Werdorf, Germany, assignors to Burger Eisenwerke Aktiengesellschaft, Wetzlar, Germany, a corporation of Germany
Filed May 23, 1967, Ser. No. 640,536
Claims priority, application Germany, May 25, 1966, B 87,279
10 Claims. (Cl. 126—379)

ABSTRACT OF THE DISCLOSURE

Kettle for the cooking and steaming of comestibles is which a double-walled vessel is supplied with a heating medium such as superheated steam and a heat exchanger is provided between the walls to which fresh water is supplied; a duct conveys steam from the interior of the heat exchanger into the inner vessel for the steaming of foods therein, the duct having a valve operable automatically with the cover to prevent the escape of steam when the cover is open. The heat exchanger surrounds at least part of the inner vessel and extends upwardly therealong whereby the quantity of steam produced and the heat transfer to the inner vessel are controlled by the quantity of steam admitted to the outer chamber or basket, by the level of water in the heat exchanger, or by the heat-exchange surface area.

---

Our present invention relates to a bulk cooking and steaming kettle and, more particularly, to a kettle capable of heating or cooking and steaming foods.

Bulk-cooking kettles have already been proposed in which an inner vessel, containing the comestible to be heated or cooked, is warmed by heat exchange with a heating fluid or medium admitted to a heating basket, the latter being formed as a chamber between the walls of a double-wall vessel. Frequently, it is desirable in the bulk cooking of foods to treat the comestible with live steam as part of the cooking process or to facilitate removal of skins, and to effect an initial parboiling or other food treatment. Such arrangements have, however, been disadvantageous in that the heating medium itself, usually superheated steam, may be insufficiently pure for this purpose or may be detrimental in thermal respects for direct treatment of the food product. It has, therefore, been necessary to provide a separate steam generator to obtain the steam necessary for the direct treatment of foods in the bulk-cooking kettle.

It is, therefore, the principal object of the present invention to provide a bulk-cooking or heating kettle in which the disadvantages of earlier systems are avoided and which, in a relatively simple and economical manner, provides greater control of the steam-generating and heating processes than has been possible heretofore.

Yet another object of this invention is to provide an improved cooking apparatus of this general character in which any auxiliary steam generator can be dispensed with.

These objects can be attained, in accordance with the present invention, by providing a bulk-cooking kettle having an inner vessel adapted to retain the food to be cooked or treated and a heating basket for this vessel which at least partly surrounds the latter and extends upwardly along the sides of the inner vessel for receiving superheated steam or other fluid (liquid or gaseous) heating medium, preferably at a temperature above the boiling point of water. Within the basket, we provide, according to the invention, a heat-exchange chamber to which fresh water may be delivered and in which the fresh water is heated by the surrounding medium to its boiling point and serves as a fresh-steam generator, a duct communicating between the heat-exchange chamber and the interior of the inner vessel.

According to a more specific feature of this invention, the kettle is of the double-wall type with the compartment between the walls forming a heating basket, the heat exchanger being generally cup-shaped and enveloping at least the bottom part of the inner vsesel while extending upwardly along the sides thereof; the duct, which can have a nozzle extending over the lip of the inner vessel for directing a jet of steam downwardly into the latter, communicating with the heat exchanger at the upper end thereof while means is provided for controlling the water level within the heat exchanger and/or controlling the quantity of heat medium introduced into the heating basket or the level at which the heating medium transfers heat to the heat exchanger, for regulating the quantity of steam produced and ejected at the jet. Furthermore, the control means for regulating the water level in the heat exchanger can include valves enabling the latter to operate as a throughflow heat exchanger whereby hot water can be recovered for cooking, washing or any other purposes.

Yet another feature of this invention resides in the provision of an automatically operable valve at the steam duct which is coupled with the cover of the vessel so that, when the cover is open, the flow of steam through the duct is automatically terminated and escape of live steam is prevented. As a result, the bulk-cooking kettle, which advantageously is provided with an elevatable platform for carrying a pot or other receptacle for the food, can be used for the steaming of food and/or ordinary heat-exchange cooking without structural modification of the apparatus and affords a high degree of control for both the steaming and the cooking operations; the dimensions of the vessel, upon change-over from cooking to steaming or vice versa need not be altered.

The above and other objects, features and advantages of the present invention will become more readily apparent from the following description, reference being made to the accompanying drawing in which the sole figure is an axial cross-sectional view of a bulk-food kettle, according to the invention.

In the drawing, we show a bulk-food kettle which comprises a housing 20 in which an inner vessel 1 is mounted, the inner vessel 1 being surrounded by an outer wall 2 forming a heating basket 21 with a chamber 4 between the wall of the inner vessel 1 and the outer wall 2. The wall 2 underlies the bottom 1a of the stainless steel or Monel inner vessel 2a but rises upwardly along the side wall 1b of the wall 20 terminating at 2b just short of the mouth in this vessel. The basket or heating chamber 21 is supplied with a heating medium, e.g. superheated steam, via a pipe 3 which has a control valve 3a therealong while a waste-steam return pipe 3b carries away any condensate or depleted steam via a further valve 3c.

Within the chamber 4, we have provided, according to this invention, a heat exchanger generally designated 5 to which fresh water is supplied by a pipe 6 through valve 6a, this heat exchanger extending upwardly to surround at least the lower portion of the inner vessel 1 and to flank the vertical wall 1a thereof within the vertical wall 2b of the basket 21. The heat exchanger 5 is formed by an outer cup-shaped member 5a which terminates at 5b above a spaced inner cup-shaped member 5c. Thus, a steam-generating compartment 5d is formed above the water level 6b within the heat exchanger 5. The water level is controlled by the valve 6a of the inlet pipe 6 and a valve 6c of an outlet pipe 6d from which fresh hot water can be derived when the heat exchanger 5 is operated as a throughflow heat exchanger. The hot water thus produced can be used for ordinary cooking purposes or for any other kitchen requirements.

The steam-generating compartment 5d communicates with the interior of the inner vessel 1 via a fresh-steam duct 7 whose heat 7a extends over the rim of the inner vessel 1 and has a nozzle 7b for directing jets 7c of steam into the interior of vessel 1and against any food products contained therein. For steaming purposes, the quantity of water flowing through the heat exchanger 5 is relatively minimum and substantially all of the water is converted to live steam for food treatment. When steaming is not required, the major portion of water flowing through the heat exchanger 5 can be withdrawn at 6d for other purposes or the flow of fresh water into the heat exchanger 5 terminating at valve 6a.

The apparatus is provided with a cover 8 which is relatively massive to prevent escape of steam when the cover is seated along the sealing rim 8a, the cover being hinged at 8b to the housing 20. To permit opening of the cover 8, it is provided with a flexible cable or chain 8c which passes over an idler roller 8d and about a deflection roller 8e to a windlass 8f. The windlass 8f may be rotated by a crank 8g exteriorly of the housing 20 or coupling, as represented by the dot-dash line 8h with a pulley 9a whose function is described in greater detail hereinafter. A spring or other mechanism 7d biases the control member 7e of a shut-off valve 7f in the steam duct 7 into its normally closed position while the control member 7e can be tied at 7h to the cable 8c at 7g or otherwise coupled with the cover 8 so that the valve 7f is automatically closed when the cover 8 is opened and the valve can be opened only when the cover 8 is closed. Escape of steam and the resulting danger to the operator upon opening of the cover is avoided.

Within the vessel 1, we provide a platform 10 for the food container, this platform having rollers 9 to permit the container 11 to be placed thereon and removed with ease. The platform 10 is suspended from cables 10a and 10b which pass over idler rollers (one shown at 10c) at the upper end of the vessel 1 and thence over deflection rollers 10d and 10e to the pulley 9a to which these cables are attached. Likewise the cable 8c, the cable 8a and 8b can be wound up manually or by motors and, to this end, the pulley 9a is coupled at 8b with the crank 8g, thereby permitting manual operation, and/or to an electric motor 10f. The latter may be placed in operation via a switch 10g.

The heat exchanger 5 can be so dimensioned that the water contained therein is completely converted to steam when valve 6c is cut off or can be only partly converted to steam or used as hot water as previously discussed. By dimensioning the vertical extent of the heat exchanger 5 in dependence upon the vertical height of the jacket 21 or the level of the medium therein (as controlled by the valve 3a and 3c) the heat transfer to the water in heat exchanger 5 can be controlled with ease.

The invention described and illustrated is believed to admit of many modifications within the ability of persons skilled in the art, all such modifications being considered within the spirit and scope of the appended claims.

We claim:

1. Bulk-cooking kettle comprising an inner vessel for receiving food to be treated, wall means forming a heating jacket partly surrounding said inner vessel and in heat-transfer relationship therewith, a heat exchanger in said jacket in heat-transfer relationship with the heating medium therein, inlet means for admitting fresh water to said heat exchanger, and a duct communicating between said heat exchanger and the interior of said vessel for subjecting food therein to treatment with steam generated in said heat exchanger.

2. A kettle as defined in claim 1 wherein said heat exchange area of said heat exchanger is dimensioned to convert the water admitted to said heat exchanger into a quantity of steam sufficient to cook the food within said vessel.

3. A kettle as defined in claim 1 wherein said heat exchanger extends upwardly in said jacket to surround at least in part said vessel.

4. A kettle as defined in claim 3 wherein said duct means communicates with said heat exchanger at an upper portion thereof, further comprising control means for regulating the level of fresh water in said heat exchanger.

5. A kettle as defined in claim 1 wherein said duct means is provided with a valve for selectively permitting and terminating the flow of steam therethrough, said kettle being provided with an openable cover for selectively closing said vessel, further comprising means automatically coupling said valve with said cover for blockage of said duct means upon the opening of said cover.

6. A kettle as defined in claim 5, further comprising an elevatable and lowerable platform received in said vessel for carrying a food product to be cooked therein.

7. A kettle as defined in claim 6, further comprising means for raising and lowering said platform couplable with said cover for joint operation of said cover and said platform.

8. A kettle as defined in claim 5, further comprising outlet means connected with said heat exchanger for leading fresh hot water therefrom.

9. A kettle as defined in claim 5 wherein said duct means has a head extending over the rim of said vessel, and nozzle means on said head for directing a jet of steam downwardly into said vessel.

10. A kettle as defined in claim 5 wherein said wall means and the walls of said heat exchanger are generally cup-shaped and are substantially coaxial with said vessel.

References Cited

UNITED STATES PATENTS

| | | | |
|---|---|---|---|
| 252,026 | 1/1882 | Fleming et al. | 126—348 |
| 798,498 | 8/1905 | Dickson | 126—377 |
| 1,421,480 | 7/1922 | Hull | 126—369 |
| 1,499,852 | 7/1924 | Cerini | 126—348 |
| 1,865,973 | 7/1932 | Shields | 126—369 |

FREDERICK L. MATTESON, JR., *Primary Examiner.*

R. A. DUA, *Assistant Examiner.*